(12) United States Patent
Kim et al.

(10) Patent No.: US 11,144,746 B1
(45) Date of Patent: Oct. 12, 2021

(54) FINGERPRINT SENSING APPARATUS WITH IN-SENSOR FINGERPRINT ENROLLMENT AND VERIFICATION

(71) Applicant: Synaptics Incorporated, San Jose, CA (US)

(72) Inventors: Kio Kim, San Francisco, CA (US); Ramakrishna Kakarala, Santa Clara, CA (US); Marcia Tsuchiya, Fremont, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 0 days.

(21) Appl. No.: 16/821,264

(22) Filed: Mar. 17, 2020

(51) Int. Cl.
*G09G 5/00* (2006.01)
*G06K 9/00* (2006.01)

(52) U.S. Cl.
CPC ....... *G06K 9/00067* (2013.01); *G06K 9/0002* (2013.01); *G06K 9/00046* (2013.01); *G06K 9/00355* (2013.01)

(58) Field of Classification Search
CPC ............... G06F 3/03547; G06F 3/0412; G06F 3/04164; G06F 3/041661; G06F 3/0446; G06K 9/0002; G09G 2300/0413; G09G 2300/0447; G09G 5/10
See application file for complete search history.

(56) References Cited

U.S. PATENT DOCUMENTS

2015/0071648 A1* 3/2015 Hong ................ H04M 1/72412
398/131
2018/0314379 A1* 11/2018 Shen ..................... G06F 3/0446

* cited by examiner

*Primary Examiner* — Insa Sadio
(74) *Attorney, Agent, or Firm* — Paradice & Li LLP

(57) ABSTRACT

A fingerprint sensing apparatus with in-sensor fingerprint enrollment and verification. The sensing apparatus includes a fingerprint sensor configured to generate sensor data in response to user contact with a sensing region and a processing system operable in at least a first mode and a second mode. When operating in the first mode, the processing system is configured to detect a fingerprint of the user based on the sensor data. When operating in the second mode, the processing system is configured to process gesture inputs based on the sensor data. In some implementations, while operating in the second mode, the processing system may selectively authenticate the user based on the gesture inputs and enable the user to enroll or manage fingerprints on the sensing apparatus when the user is authenticated.

20 Claims, 9 Drawing Sheets

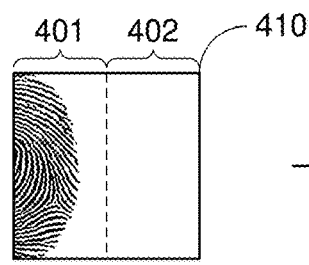
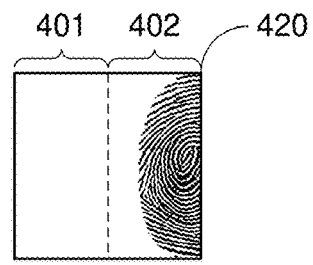
FIG. 4A    FIG. 4B
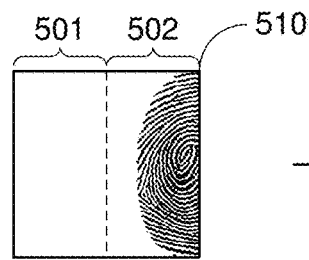
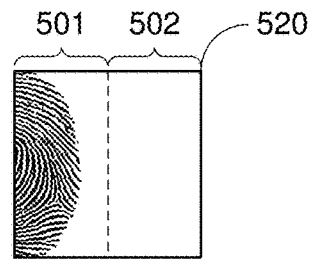
FIG. 5A    FIG. 5B
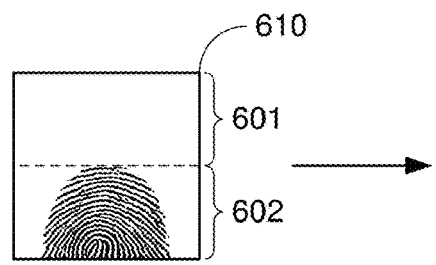
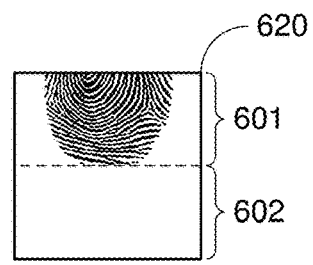
FIG. 6A    FIG. 6B
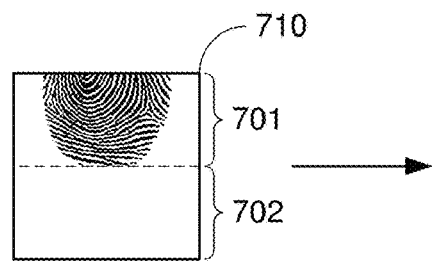
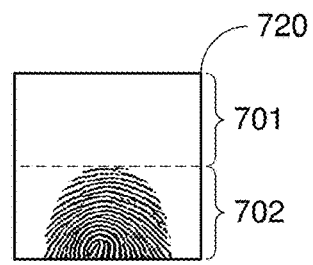
FIG. 7A    FIG. 7B

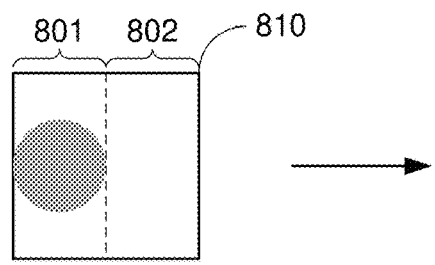 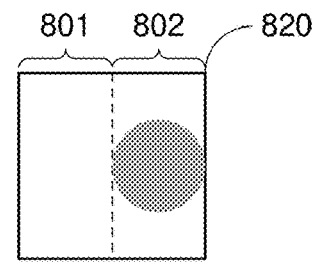
FIG. 9A  FIG. 9B
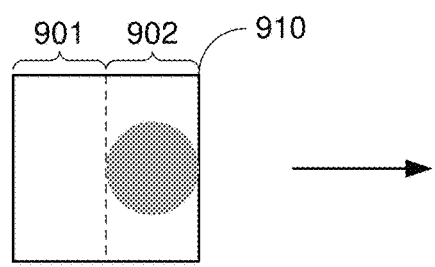 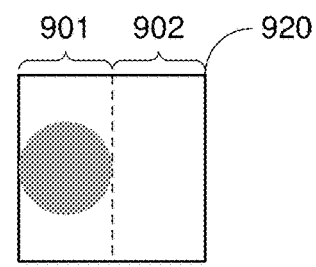
FIG. 10A  FIG. 10B
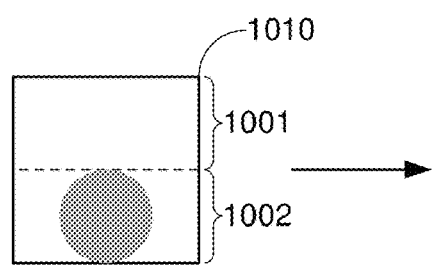 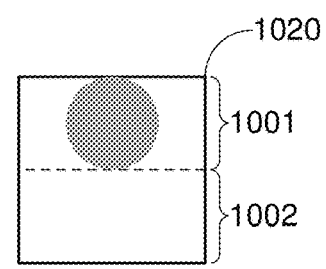
FIG. 11A  FIG. 11B
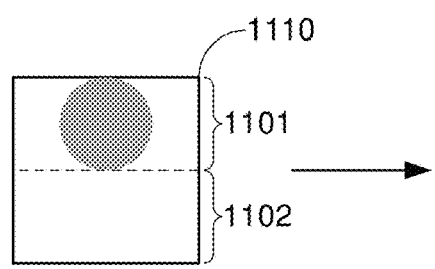 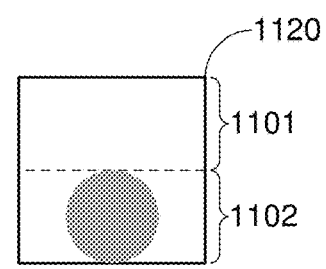
FIG. 12A  FIG. 12B

FINGERPRINT SENSING APPARATUS WITH IN-SENSOR FINGERPRINT ENROLLMENT AND VERIFICATION

TECHNICAL FIELD

The present embodiments relate generally to input devices, and specifically to a fingerprint sensing apparatus with in-sensor fingerprint enrollment and verification.

BACKGROUND OF RELATED ART

Authentication is a mechanism for verifying the identity of a user (e.g., an individual or entity) attempting to access a device and/or application. A basic form of authentication may require a user to input a username and password via an input device. However, usernames and passwords are easily stolen and can be used by unauthorized individuals to gain access to a corresponding device or application. Thus, modern authentication schemes increasingly rely on biometric sensors to provide greater levels of security. Biometric sensors are capable of identifying unique biological characteristics of a user. More specifically, biometric sensors may be configured to receive biometric inputs (e.g., user inputs containing one or more biometric signatures). Example biometric sensors include fingerprint scanners, facial recognition systems, eye scanners, voice recognition systems, and the like.

Before a biometric sensor can be used for authentication, the user must first enroll or register one or more biometric signatures (e.g., fingerprint, face, retina, voice, and the like). During the enrollment process, the user may be required to provide a biometric input multiple times with slightly different variations, such as by changing the pose, orientation, and/or offset of the biometric input. Once the enrollment process is completed, the biometric sensors may be configured and/or trained to recognize the user's biometric signature. The biometric sensors may then be used to authenticate the user in response to subsequent biometric inputs.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

A system and method for providing in-sensor fingerprint enrollment and verification is disclosed. One innovative aspect of the subject matter of this disclosure can be implemented in a sensing apparatus including a fingerprint sensor configured to generate sensor data in response to user contact with a sensing region and a processing system operable in at least a first mode and a second mode. When operating in the first mode, the processing system is configured to detect a fingerprint of the user based on the sensor data. When operating in the second mode, the processing system is configured to process gesture inputs based on the sensor data. In some implementations, while operating in the second mode, the processing system may selectively authenticate the user based on the gesture inputs and enable the user to enroll or manage fingerprints on the sensing apparatus when the user is authenticated.

Another innovative aspect of the subject matter of this disclosure can be implemented in a method performed by a sensing apparatus operable in at least a first mode and a second mode. The method includes steps of receiving sensor data from a fingerprint sensor in response to user contact with a sensing region, detecting a fingerprint of the user based on the received sensor data when operating in the first mode, and processing gesture inputs based on the received sensor data when operating in the second mode. In some implementations, while operating in the second mode, the method may further include steps of selectively authenticating the user based on the gesture inputs and enabling the user to enroll or manage fingerprints on the sensing apparatus when the user is authenticated.

Another innovative aspect of the subject matter of this disclosure can be implemented in a system including one or more processors and a memory, where the system is operable in at least a first mode and a second mode. The memory stores instructions that, when executed by the one or more processors, cause the display device to detect a notification output by an input device; match the notification to a content item stored on the second device, where the content item includes instructions for providing a user input on the input device; and render the content item on the display.

BRIEF DESCRIPTION OF THE DRAWINGS

The present embodiments are illustrated by way of example and are not intended to be limited by the figures of the accompanying drawings.

FIGS. 4A and 4B show a sequence of frames of sensor data corresponding to an example gesture input according to some embodiments.

FIGS. 5A and 5B show a sequence of frames of sensor data corresponding to an example gesture input according to some embodiments.

FIGS. 6A and 6B show a sequence of frames of sensor data corresponding to an example gesture input according to some embodiments.

FIGS. 7A and 7B show a sequence of frames of sensor data corresponding to an example gesture input according to some embodiments.

FIGS. 9A and 9B show a sequence of frames of sensor data corresponding to an example gesture input according to some embodiments.

FIGS. 10A and 10B show a sequence of frames of sensor data corresponding to an example gesture input according to some embodiments.

FIGS. 11A and 11B show a sequence of frames of sensor data corresponding to an example gesture input according to some embodiments.

FIGS. 12A and 12B show a sequence of frames of sensor data corresponding to an example gesture input according to some embodiments.

DETAILED DESCRIPTION

Figure 1:
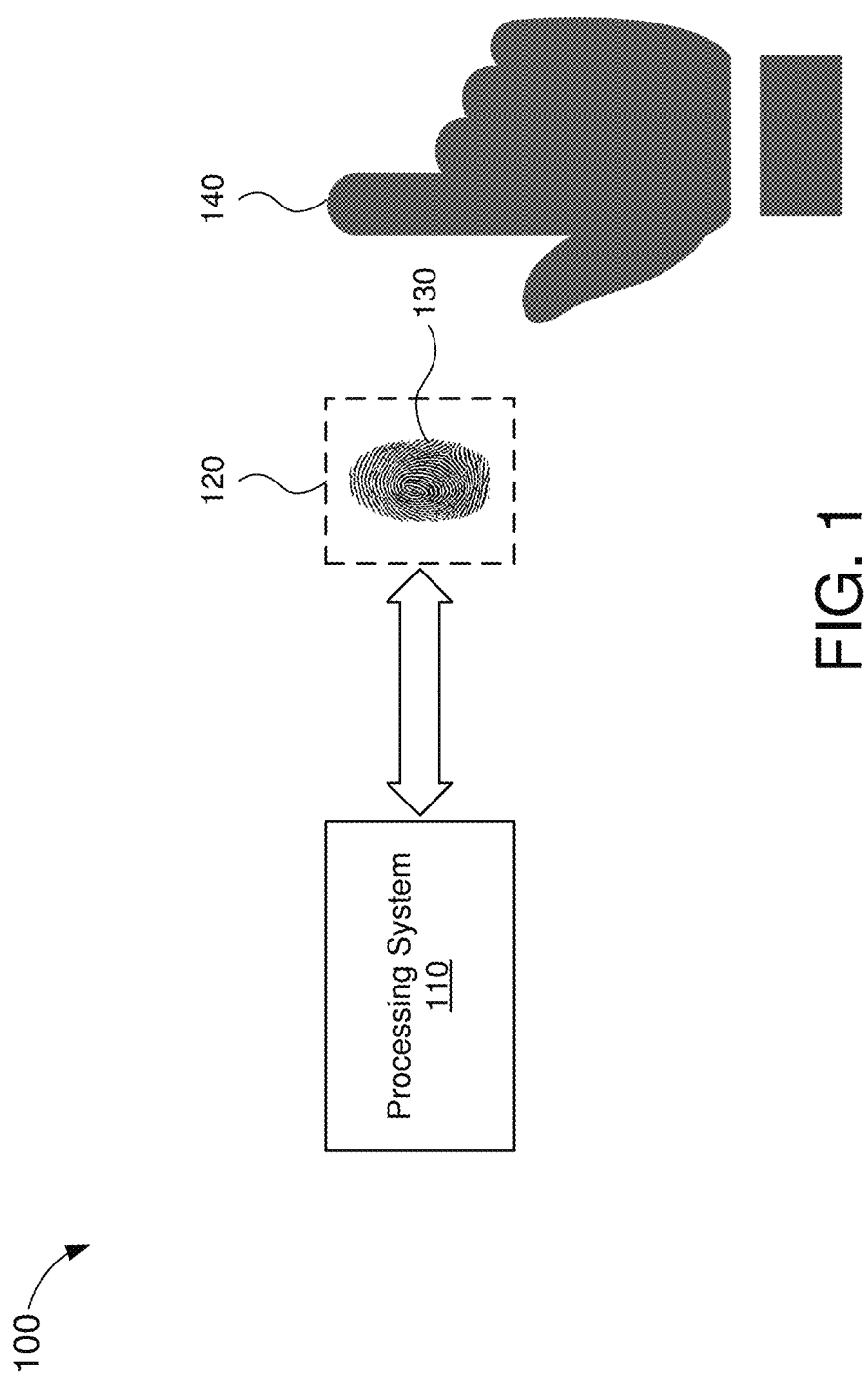
FIG. 1 shows an example input device within which the present embodiments may be implemented.

In the following description, numerous specific details are set forth such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the aspects of the disclosure. However, it will be apparent to one skilled in the art that these specific details may not be required to practice the example embodiments. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory. The interconnection between circuit elements or software blocks may be shown as buses or as single signal lines. Each of the buses may alternatively be a single signal line, and each of the single signal lines may alternatively be buses, and a single line or bus may represent any one or more of a myriad of physical or logical mechanisms for communication between components.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory computer-readable storage medium comprising instructions that, when executed, performs one or more of the methods described above. The non-transitory computer-readable storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors. The term "processor," as used herein may refer to any general-purpose processor, conventional processor, controller, microcontroller, special-purpose processor, and/or state machine capable of executing scripts or instructions of one or more software programs stored in memory.

FIG. 1 shows an example input device 100 within which the present embodiments may be implemented. The input device 100 includes a processing system 110 and a sensing region 120. In some implementations, the input device 100 may be configured to provide input and/or control access to an electronic system (not shown for simplicity). Example electronic systems may include, but are not limited to, personal computing devices (e.g., desktop computers, laptop computers, netbook computers, tablets, web browsers, e-book readers, personal digital assistants (PDAs), and the like), composite input devices (e.g., physical keyboards, joysticks, key switches, and the like), data input device (e.g., remote controls, mice, and the like), data output devices (e.g., display screens printers, and the like), remote terminals, kiosks, video game machines (e.g., video game consoles, portable gaming devices, and the like), communication devices (e.g., cellular phones, smartphones, and the like), and media devices (e.g., recorders, editors, televisions, set-top boxes, music players, digital photo frames, digital cameras, and the like).

In some aspects, the input device 100 may be implemented as a physical part of the corresponding electronic system. Alternatively, the input device 100 may be physically separated from the electronic system. The input device 100 may be coupled to (and communicate with) components of the electronic system using various wired and/or wireless interconnection and communication technologies, such as buses and networks. Example suitable technologies may include Inter-Integrated Circuit ($I^2C$), Serial Peripheral Interface (SPI), PS/2, Universal Serial bus (SUB), Bluetooth®, Infrared Data Association (IrDA), and various radio frequency (RF) communication protocols defined by the IEEE 802.11 family of standards.

In the example of FIG. 1, the input device 100 may correspond to a fingerprint sensor device (also referred to as a "fingerprint scanner" or "fingerprint sensing apparatus") configured to sense input provided by an input object 140 in the sensing region 120. In some embodiments, the input object 140 may correspond to a user's finger or fingertip. The sensing region 120 may encompass any space above, around, in, and/or proximate to the input device 100 in which the input device 100 is able to detect user input. The size, shape, and/or location of the sensing region 120 may vary depending on actual implementations. In some embodiments, the sensing region 120 may extend from a surface of the input device 100 in one or more directions in space, for example, until a signal-to-noise ratio (SNR) of the sensors falls below a threshold suitable for fingerprint detection. For example, the distance to which the sensing region 120 extends in a particular direction may be on the order of less than a millimeter, millimeters, centimeters, or more, and may vary with the type of sensing technology used and/or accuracy desired.

The input device 100 may utilize various sensing technologies to detect user input. Example sensing technologies may include capacitive, optical, and ultrasonic sensing technologies. In some embodiments, the sensing region 120 may be formed by an array of light sensing elements (e.g., photodiodes, CMOS image sensor arrays, CCD arrays, or any other sensors capable of detecting wavelengths of light in the visible spectrum, the infrared spectrum or the ultraviolet spectrum) that are used to capture high resolution images of the sensing region 120. More specifically, the amount of light accumulated on each of the light sensing elements may be correlated to the ridges and valleys in the user's finger. In some other embodiments, the sensing region 120 may be formed by an array of capacitive sensing elements (e.g., sensor electrodes) that are used to measure changes in capacitance resulting from a finger interacting with the sensing region 120. More specifically, the amount of charge accumulated on the capacitive sensing elements may be correlated to the ridges and valleys in the user's finger.

The processing system 110 may be implemented as a set of modules that are implemented in firmware, software, or a combination thereof. Example modules include hardware operation modules for operating hardware such as one or more sensing elements; data processing modules for processing data such as sensor signals; and reporting modules for reporting information to other components of the electronic system such as a host processor or CPU. In some embodiments, the processing system 110 may include sensor operation modules configured to operate sensing elements to detect user inputs in the sensing region 120; authentication modules configured to authenticate a user of the input device 100 and/or electronic system based at least in part on the user inputs; identification modules configured to identify gestures associated with certain user inputs; and mode changing modules for changing operation modes of the input device 100 and/or electronic system.

In some embodiments, the processing system 110 may operate independently of a host processor or central processing unit (CPU) which controls other functions and operations of the electronic system. More specifically, the processing system 110 may not depend on the host processor to perform certain operations related to the processing of user inputs (such as fingerprint enrollment and verification). In some other embodiments, the input device 100 may be a complete electronic system. For example, the input device 100 may be configured to perform one or more functions in response to the user inputs. Example actions may include, but are not limited to, unlocking a door, opening an automated (e.g., garage) door, changing the channel on a television, or changing an operation mode of the input device 100.

In some embodiments, the input device 100 may operate without a rich user interface (UI). As used herein, the term "rich UI" may refer to any sensor or input feature capable of receiving complex (e.g., non-binary) user inputs. More specifically, a rich UI may generate different types of sensor output in response to different user inputs. Example input devices with rich UIs may include, but are not limited to, touchscreens, touchpads, keypads, keyboards, and the like. Rich UIs may be useful for certain tasks, such as authenticating a user. For example, before the input device 100 can be used for fingerprint verification, the user must first "enroll" one or more fingerprints with the input device 100. A low-level authentication is needed to prevent unauthorized individuals from accessing the fingerprint enrollment feature of the input device 100. On many electronic systems, this low-level authentication is managed by a host processor or CPU coupled to a rich UI. For example, the user may input a unique password or passcode via the rich UI to unlock or activate the fingerprint enrollment mode.

Rich UI components tend to be expensive and consume large amounts of space, power, and processing resources. The dependency on a host processor or CPU further adds to the cost and complexity of the electronic system. Moreover, certain electronic systems (such as remote controls, key switches, key fobs, and various appliances) may not benefit from any additional functionality which a rich UI may otherwise provide. Aspects of the present disclosure recognize that fingerprint sensor devices tend to operate primarily in a fingerprint verification mode, and that enrollment operations tend to be triggered rarely (if ever) beyond an initial setup. Thus, the input device 100 may not benefit from having a rich UI for a majority of its operation. Such low frequency of use may not outweigh the cost or sacrifices in performance, battery life, size and/or design needed to add a rich UI to the input device 100.

In some embodiments, the input device 100 may use fingerprint sensor data received via the sensing region 120 to perform low-level user authentication for purposes of switching between the fingerprint verification mode and the fingerprint enrollment mode. In some aspects, the processing system 110 may detect one or more gesture inputs based on a sequence of frames of sensor data generated by the sensing elements. Each frame of sensor data may correspond to optical or capacitive scan of the sensing region 120. The user may be authenticated by providing a unique sequence of gesture inputs in the sensing region 120. By repurposing the fingerprint sensor data to detect gesture inputs, the present embodiments may enable the input device 100 to be operated as a self-contained electronic system (e.g., for fingerprint enrollment and verification), without any assistance from a host processor or CPU. More specifically, the input device 100 may operate as a standalone authentication system that is not tethered or otherwise coupled to a larger electronic system or computing device (such as a smartphone or personal computer).

Without a rich UI, the input device 100 may retain a small form factor and relatively low hardware complexity. For example, in a particular embodiment, the input device 100 may implemented as a car key fob. The key fob may require user fingerprint verification before allowing access to one or more vehicle controls (such as unlocking the doors or turning on the engine). In some aspects, the key fob may perform a low-level user authentication based on gesture inputs detected from fingerprint sensor data. Once authenticated, the user may enroll and/or manage his or her fingerprint(s) on the key fob. During the enrollment process, the key fob may generate and store one or more fingerprint templates for the user based on the received fingerprint sensor data. Thereafter, the key fob may operate by comparing fingerprint sensor data against the stored fingerprint templates to verify the user's fingerprint and provide access to the vehicle.

Figure 2:
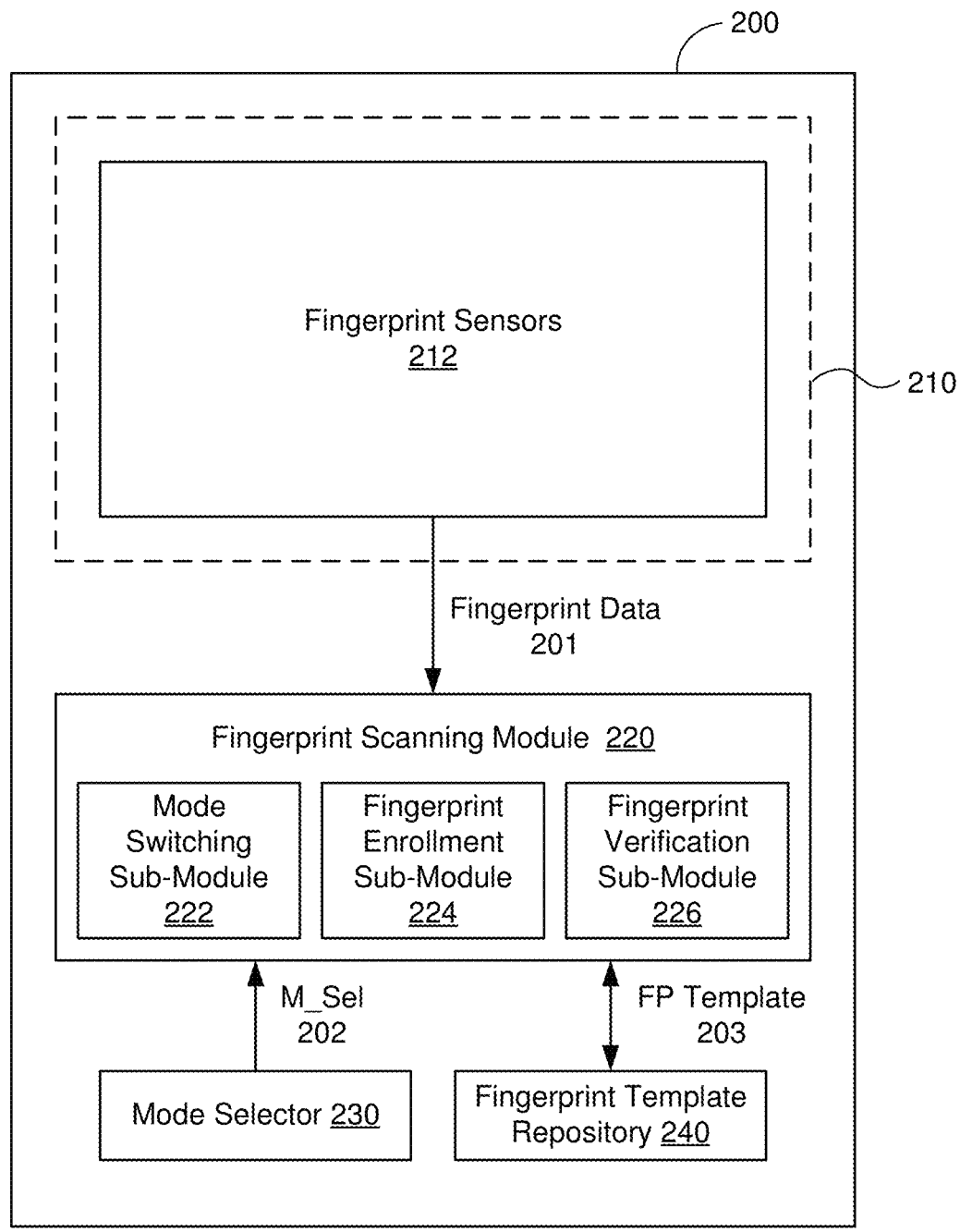
FIG. 2 shows a block diagram of a fingerprint sensing apparatus according to some embodiments.

FIG. 2 shows a block diagram of a fingerprint sensing apparatus 200 according to some embodiments. The fingerprint sensing apparatus 200 may be an example embodiment of the input device 100 of FIG. 1. The fingerprint sensing apparatus 200 includes a sensing region 210 and a fingerprint scanning module 220. The sensing region 210 may encompass any space above, around, in, and/or proximate to the fingerprint sensing apparatus 200 in which the sensing apparatus 200 is able to detect user input, such as provided by a user's finger (not shown for simplicity). The size, shape, and/or location of the sensing region 210 may vary depending on actual implementations.

In some embodiments, the sensing region 210 includes, or is otherwise coupled to one or more fingerprint sensors 212.

The fingerprint sensors 212 may use capacitive and/or optical fingerprint imaging technologies to scan or image a user's finger in the sensing region 210. In some embodiments, the fingerprint sensors 212 may include an array of light sensing elements (e.g., photodiodes, CMOS image sensor arrays, CCD arrays, or any other sensors capable of detecting wavelengths of light in the visible spectrum, the infrared spectrum or the ultraviolet spectrum) that are used to capture high resolution images of the sensing region 210 when a user's finger is present. Fingerprint data 201 generated by the light sensing elements may include optical images of a user's fingerprint. In some other embodiments, the fingerprint sensors 212 may be formed by an array of capacitive sensing elements (e.g., sensor electrodes) that are used to measure changes in capacitance resulting from a finger interacting with the sensing region 210. Fingerprint data 201 generated by the capacitive sensing elements may include capacitive images of a user's fingerprint.

The fingerprint scanning module 220 may be implemented by, or include at least a portion of, a processing system (such as processing system 110) that controls an operation of the fingerprint sensors 212. The fingerprint scanning module 220 may operate the fingerprint sensors 212 to scan (e.g., capture an image of) a user's fingerprint and verify whether the fingerprint is associated with an authorized user of the input sensing apparatus 200 or electronic system. In some embodiments, the fingerprint scanning module 220 may be operable in a verification mode and an enrollment mode. When operating in the enrollment mode, the fingerprint scanning module 220 may extract and/or store identifying characteristics and/or attributes of a user's fingerprint. When operating in the verification mode, the fingerprint scanning module 220 may compare the fingerprint data 201 received from the fingerprint sensors 212 with the characteristics and/or attributes of an authorized user's fingerprint to selectively validate or authenticate a current user of the fingerprint sensing apparatus 200.

In some embodiments, the input fingerprint scanning module 220 may include a mode switching sub-module 222, a fingerprint enrollment sub-module 224, and a fingerprint verification sub-module 226. The mode switching sub-module 222 may selectively operate the fingerprint scanning module 220 in the enrollment mode or the verification mode. In some embodiments, the mode switching sub-module 222 may switch between the enrollment mode and the verification mode based, at least in part, on a mode select (M_Sel) signal 202 received from a mode selector 230. In some embodiments, the mode selector 230 may include one or more electrical or mechanical actuators (e.g., buttons, switches, toggles, capacitive sensors, and the like) that may be used to provide a selection input to the input sensing apparatus 200. In some aspects, the mode selector 230 may be integrated with (e.g., disposed under) the fingerprint sensors 212. In some other aspects, the mode selector 230 may be located apart from the fingerprint sensors 212. The mode selector 230 may output (e.g., assert or activate) the mode select signal 202 in response to user input.

In some embodiments, the mode switching sub-module 222 may switch to the enrollment mode when the mode select signal 202 is activated. However, the fingerprint scanning module 220 may require user authentication before permitting the user to enroll or manage one or more fingerprints. Thus, upon entering the enrollment mode, the mode switching sub-module 222 may process fingerprint data 201 received via the fingerprint sensors 212 to perform a low-level user authentication. In some embodiments, the mode switching sub-module 222 may be configured to detect gesture inputs based on the received fingerprint data 201. The gesture inputs may correspond to directional swiping gestures (e.g., left, right, up, or down) and/or tapping gestures. The mode switching sub-module 222 may compare the direction, magnitude, duration, and/or orientation of the gesture inputs to a preconfigured pattern or combination of gestures. In some embodiments, the preconfigured combination of gestures may be input by the user during an initial setup of the fingerprint sensing apparatus 200. In some other embodiments, the preconfigured combination of gestures may be reset by the user after the initial setup.

In some embodiments, the mode switching sub-module 222 may selectively switch between the enrollment mode and the verification mode based, at least in part, on the gesture inputs. If the received gesture inputs do not match the preconfigured combination of gestures (e.g., authentication is unsuccessful), the mode switching sub-module 222 may exit or terminate the enrollment mode. More specifically, the mode switching sub-module 222 may pass the control and/or operation of the fingerprint sensing apparatus 200 to the fingerprint verification sub-module 226. In some aspects, the mode switching sub-module 222 may generate a visual notification to indicate an unsuccessful authentication attempt. For example, the visual notification may include a blinking or encoded light, emitted by one or more light sources, having a first color (e.g., red) or frequency in the visible spectrum, the infrared (IR) spectrum, or the ultraviolet (UV) spectrum.

In some other aspects, the mode switching sub-module 222 may generate an audible notification (to indicate an unsuccessful authentication attempt. For example, the audible notification may include a loud or encoded sound, emitted by one or more speakers, having a first tone encoded in one or more frequency bands in the audible range, the supersonic range, or the subsonic range. Still further, in some aspects, the mode switching sub-module 222 may prevent the fingerprint scanning module 220 from re-entering the enrollment mode for at least a threshold duration after a failed authentication attempt. For example, the mode switching sub-module 222 may not respond to any subsequent assertions of the mode select signal 202 received before the threshold duration has expired.

If the received gesture inputs match the preconfigured combination of gestures (e.g., authentication is successful), the mode switching sub-module 222 may allow the fingerprint scanning module 220 to continue operating in the enrollment mode. In some aspects, the mode switching sub-module 222 may generate a visual notification to indicate a successful authentication attempt. For example, the visual notification may include a blinking or encoded light, emitted by one or more light sources, having a second color (e.g., green) or frequency in the visible spectrum, the IR spectrum, or the UV spectrum.

In some other aspects, the mode switching sub-module 222 may generate an audible notification to indicate a successful authentication attempt. For example, the audible notification may include a soft or encoded sound, emitted by one or more speakers, having a second tone encoded in one or more frequency bands in the audible range, the supersonic range, or the subsonic range. Upon authenticating the user, the mode switching sub-module 222 may allow the user to subsequently enroll, manage, or delete one or more fingerprint (FP) templates 203 on the fingerprint scanning module 220. More specifically, the mode switching sub-module 222 may pass the control and/or operation of the fingerprint sensing apparatus 200 to the fingerprint enrollment sub-module 224.

The fingerprint enrollment sub-module 224 may enroll and/or manage one or more fingerprints of an authorized user. For example, during an enrollment operation, the fingerprint enrollment sub-module 224 may capture one or more images of the user's finger, in various positions and/or orientations, while placed in the sensing region 210. In some embodiments, the fingerprint enrollment sub-module 224 may generate one or more fingerprint templates 203 for the user (e.g., which may include the captured images) based on identifying features of the user's fingerprints. The identifying features may include a pattern of ridges and/or valleys on the surface of the user's finger.

In some embodiments, the fingerprint enrollment sub-module 224 may generate an optical and/or acoustic signal to indicate a level of completion or progress of the enrollment process. For example, a unique optical and/or acoustic signal or pattern of signals may be output when the captured images satisfy one or more requirements for use in generating the fingerprint templates 203 (e.g., features are correctly identified and/or image quality is acceptable). The fingerprint templates 203 may be stored in a fingerprint template repository 240. When the user is finished enrolling (or managing) one or more fingerprint templates 203, the fingerprint scanning module 200 may switch back to the verification mode. More specifically, the fingerprint enrollment sub-module 224 may pass the control and/or operation of the fingerprint sensing apparatus 200 to the fingerprint verification sub-module 226. In some embodiments, the fingerprint enrollment sub-module 224 may generate an optical and/or acoustic signal to indicate completion of the enrollment process.

The fingerprint verification sub-module 226 may analyze fingerprint data 201 captured while the fingerprint sensing apparatus 200 is in the verification mode to determine whether the user is authorized to control or operate the electronic system. In some aspects, the fingerprint verification sub-module 226 may trigger the fingerprint sensors 212 to capture the fingerprint data 201 when a verification event is triggered. For example, a verification event may be detected when a finger or input object makes contact with a portion of the sensing region 210 coinciding with the fingerprint sensors 212. In some embodiments, the fingerprint verification sub-module 226 may use the fingerprint templates 203 stored in the fingerprint repository 240 to determine whether the received fingerprint data 201 is associated with a known or authorized user of the input device 200.

The fingerprint verification sub-module 226 may compare the received fingerprint data 201 with one or more fingerprint templates 203 to verify the user's fingerprint. In some aspects, the fingerprint verification sub-module 226 may verify the user's fingerprint if the fingerprint information and/or enrollment images included with the fingerprint template 203 match the received fingerprint data 201 (e.g., regardless of position or orientation). In some implementations, the fingerprint verification sub-module 226 may use existing or known fingerprint matching techniques to determine a measure of similarity between the received fingerprint data 201 and the fingerprint templates 203. If a verified fingerprint cannot be detected from the fingerprint data 201 (e.g., the similarity measure is below a threshold level), the fingerprint verification sub-module 226 may prevent the user from accessing or operating at least some aspects of the corresponding electronic system.

Figure 3:
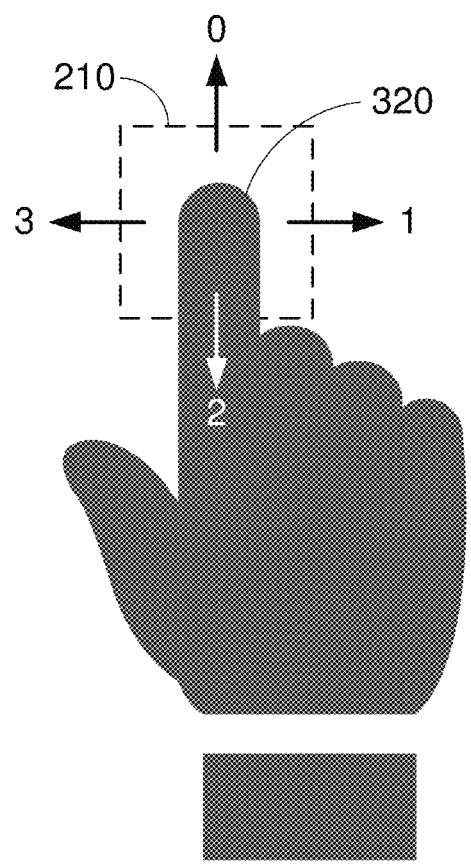
FIG. 3 shows example gesture inputs that may be detected by a fingerprint sensing apparatus according to some embodiments.

FIG. 3 shows example gesture inputs that may be detected via the sensing region 210 of the fingerprint sensing apparatus 200 according to some embodiments. The fingerprint sensing apparatus 200 may be configured to detect inputs provided by a user's finger 320 in the sensing region 210. For example, the fingerprint sensing apparatus 200 may capture or acquire frames of sensor data from the fingerprint sensors 212 when the finger 320 is in contact with (or proximity of) the sensing region 210. In some embodiments, the fingerprint sensing apparatus 200 may detect or identify the user's fingerprint based on the captured frames of sensor data. For example, each frame of sensor data may include or correspond to a high-resolution image of the sensing region 210.

In some other embodiments, the fingerprint sensing apparatus 200 may detect gesture inputs based on successive frames of sensor data. In some aspects, when operating in the enrollment mode, the fingerprint scanning module 220 may activate the fingerprint sensors 212 to capture or acquire high-resolution frames of sensor data from the sensing region 210. For example, the high-resolution frames may include details of the user's fingerprint. In some other aspects, when operating in the enrollment mode, the fingerprint scanning module 220 may activate only a subset of the fingerprint sensors 212 to capture or acquire lower-resolution frames of sensor data from the sensing region 210. For example, aspects of the present disclosure recognize that high-resolution sensor data suitable for fingerprint detection may not be necessary or practical for detecting certain gestures (such as fast swiping motions). In contrast, lower-resolution frames may be acquired more quickly by the fingerprint scanning module 220, and thus, more suitable for fast object detection and/or tracking.

As shown in FIG. 3, the fingerprint sensing apparatus 200 may detect a movement or swiping motion of the finger 320 across the sensing region 210 from two or more frames captured in succession. In some aspects, each gesture input may be correlated with a particular direction, magnitude, duration, and/or orientation of movement. For example, the fingerprint sensing apparatus 200 may be configured to detect left, right, up, and down finger swipes in the sensing region 210. Additionally, or alternatively, the fingerprint sensing apparatus 200 may be configured to detect tap-related gestures (e.g., tap, long press, press-and-hold, and the like). In some aspects, each gesture may be associated with a different numeric value. For example, a swipe up may be associated with a value of "0," a swipe right may be associated with a value of "1," a swipe down may be associated with a value of "2," and a swipe left may be associated with a value of "3." Accordingly, a unique sequence of gestures may be input as a passcode to authenticate a user of the fingerprint sensing apparatus 200 (e.g., similar to a combination lock).

FIGS. 4A-8C show example frames of sensor data that can be used to detect gesture inputs. In the examples of FIGS. 4A-8C, each frame of sensor data may correspond to a high-resolution image of a corresponding sensing region. For example, the frames of sensor data may be captured or acquired by activating a plurality of sensing elements of a fingerprint sensor. As shown in FIGS. 4A-8C, each frame of sensor data may capture details of a user's fingerprint which may be suitable for fingerprint detection and/or analysis.

FIGS. 4A and 4B show a sequence of frames of sensor data 410 and 420, respectively, corresponding to an example gesture input according to some embodiments. More specifically, the frame 420 of FIG. 4B may be captured sometime after the frame 410 of FIG. 4A. In the example of FIGS. 4A and 4B, the gesture input may correspond to a rightward swiping motion. As shown in FIG. 4A, at least a portion of the user's fingerprint is detected in a left half 401 of the frame 410 while no portion (or a smaller portion) of the user's fingerprint is detected in a right half 402 of the frame 410. With reference for example to FIG. 3, the frame 410 may be captured when the finger 320 is located on the left edge of the sensing region 210. In contrast, as shown in FIG. 4B, at least a portion of the user's fingerprint is detected in the right half 402 of the frame 420 while no portion (or a smaller portion) of the user's fingerprint is detected in the left half 401 of the frame 420. With reference for example to FIG. 3, the frame 420 may be captured when the finger 320 is located on the right edge of the sensing region 210.

FIGS. 5A and 5B show a sequence of frames of sensor data 510 and 520, respectively, corresponding to an example gesture input according to some embodiments. More specifically, the frame 520 of FIG. 5B may be captured sometime after the frame 510 of FIG. 5A. In the example of FIGS. 5A and 5B, the gesture input may correspond to a leftward swiping motion. As shown in FIG. 5A, at least a portion of the user's fingerprint is detected in a right half 502 of the frame 510 while no portion (or a smaller portion) of the user's fingerprint is detected in a left half 501 of the frame 510. With reference for example to FIG. 3, the frame 510 may be captured when the finger 320 is located on the right edge of the sensing region 210. In contrast, as shown in FIG. 5B, at least a portion of the user's fingerprint is detected in the left half 501 of the frame 520 while no portion (or a smaller portion) of the user's fingerprint is detected in the right half 502 of the frame 520. With reference for example to FIG. 3, the frame 520 may be captured when the finger 320 is located on the left edge of the sensing region 210.

FIGS. 6A and 6B show a sequence of frames of sensor data 610 and 620, respectively, corresponding to an example gesture input according to some embodiments. More specifically, the frame 620 of FIG. 6B may be captured sometime after the frame 610 of FIG. 6A. In the example of FIGS. 6A and 6B, the gesture input may correspond to an upward swiping motion. As shown in FIG. 6A, at least a portion of the user's fingerprint is detected in a bottom half 602 of the frame 610 while no portion (or a smaller portion) of the user's fingerprint is detected in a top half 601 of the frame 610. With reference for example to FIG. 3, the frame 610 may be captured when the finger 320 is located on the bottom edge of the sensing region 210. In contrast, as shown in FIG. 6B, at least a portion of the user's fingerprint is detected in the top half 601 of the frame 620 while no portion (or a smaller portion) of the user's fingerprint is detected in the bottom half 602 of the frame 620. With reference for example to FIG. 3, the frame 620 may be captured when the finger 320 is located on the top edge of the sensing region 210.

FIGS. 7A and 7B show a sequence of frames of sensor data 710 and 720, respectively, corresponding to an example gesture input according to some embodiments. More specifically, the frame 720 of FIG. 7B may be captured sometime after the frame 710 of FIG. 7A. In the example of FIGS. 7A and 7B, the gesture input may correspond to a downward swiping motion. As shown in FIG. 7A, at least a portion of the user's fingerprint is detected in a top half 701 of the frame 710 while no portion (or a smaller portion) of the user's fingerprint is detected in a bottom half 702 of the frame 710. With reference for example to FIG. 3, the frame 710 may be captured when the finger 320 is located on the top edge of the sensing region 210. In contrast, as shown in FIG. 7B, at least a portion of the user's fingerprint is detected in the bottom half 702 of the frame 720 while no portion (or a smaller portion) of the user's fingerprint is detected in the top half 701 of the frame 720. With reference for example to FIG. 3, the frame 720 may be captured when the finger 320 is located on the bottom edge of the sensing region 210.

Figures 8A, 8B, 8C:
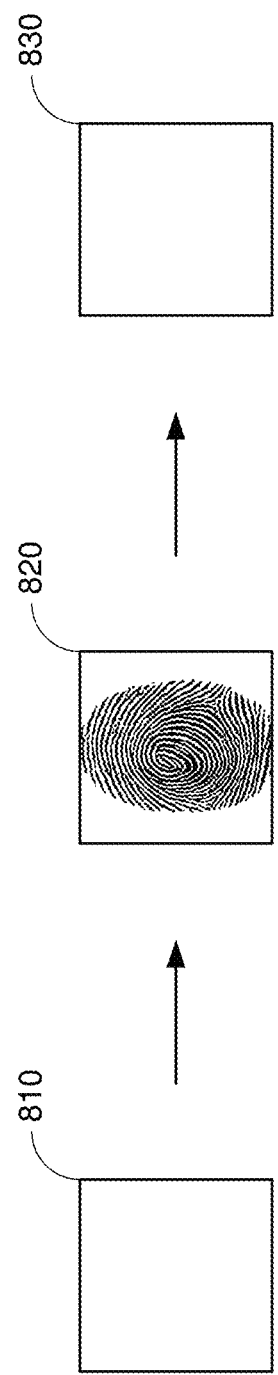
FIGS. 8A-8C show a sequence of frames of sensor data corresponding to an example gesture input according to some embodiments.

FIGS. 8A-8C show a sequence of frames of sensor data 810-830, respectively, corresponding to an example gesture input according to some embodiments. More specifically, the frame 820 of FIG. 8B may be captured sometime after the frame 810 of FIG. 8A, and the frame 830 of FIG. 8C may be captured sometime after the frame 820 of FIG. 8B. In the example of FIGS. 8A-8C, the gesture input may correspond to a tapping motion. As shown in FIG. 8A, no portion of the user's fingerprint is detected in the frame 810. Then, as shown in FIG. 8B, at least a portion of the user's fingerprint is detected in the frame 820. Finally, as shown in FIG. 9C, no portion of the user's fingerprint is detected in the frame 830. In some implementations, the fingerprint may be detected in substantially the same position across a number of consecutive frames (between frames 810 and 830). The duration of the tapping gesture may be correlated with the number of consecutive frames in which the fingerprint is detected.

FIGS. 9A-13C show example frames of sensor data that can be used to detect gesture inputs. In the examples of FIGS. 9A-13C, each frame of sensor data may correspond to a low-resolution image of a corresponding sensing region. For example, each frame of sensor data may be captured or acquired by activating a subset of sensing elements of a fingerprint sensor. As shown in FIGS. 9A-13C, each frame of sensor data may capture a presence of an object (or lack thereof) with a relatively coarse granularity.

FIGS. 9A and 9B show a sequence of frames of sensor data 910 and 920, respectively, corresponding to an example gesture input according to some embodiments. More specifically, the frame 920 of FIG. 9B may be captured sometime after the frame 910 of FIG. 9A. In the example of FIGS. 9A and 9B, the gesture input may correspond to a rightward swiping motion. As shown in FIG. 9A, an object (depicted as a gray circle) is detected in a left half 901 of the frame 910 while no object is detected in a right half 902 of the frame 910. With reference for example to FIG. 3, the frame 910 may be captured when the finger 320 is located on the left edge of the sensing region 210. In contrast, as shown in FIG. 9B, an object is detected in the right half 902 of the frame 920 while no object is detected in the left half 901 of the frame 920. With reference for example to FIG. 3, the frame 920 may be captured when the finger 320 is located on the right edge of the sensing region 210.

FIGS. 10A and 10B show a sequence of frames of sensor data 1010 and 1020, respectively, corresponding to an example gesture input according to some embodiments. More specifically, the frame 1020 of FIG. 10B may be captured sometime after the frame 1010 of FIG. 10A. In the example of FIGS. 10A and 10B, the gesture input may correspond to a leftward swiping motion. As shown in FIG. 10A, an object (depicted as a gray circle) is detected in a right half 1002 of the frame 1010 while no object is detected in a left half 1001 of the frame 1010. With reference for example to FIG. 3, the frame 1010 may be captured when the finger 320 is located on the right edge of the sensing region 210. In contrast, as shown in FIG. 10B, an object is detected in the left half 1001 of the frame 1020 while no object is detected in the right half 1002 of the frame 1020. With reference for example to FIG. 3, the frame 1020 may be captured when the finger 320 is located on the left edge of the sensing region 210.

FIGS. 11A and 11B show a sequence of frames of sensor data 1110 and 1120, respectively, corresponding to an example gesture input according to some embodiments. More specifically, the frame 1120 of FIG. 11B may be captured sometime after the frame 1110 of FIG. 11A. In the example of FIGS. 11A and 11B, the gesture input may correspond to an upward swiping motion. As shown in FIG. 11A, an object (depicted as a gray circle) is detected in a bottom half 1102 of the frame 1110 while no object is detected in a top half 1101 of the frame 1110. With reference for example to FIG. 3, the frame 1110 may be captured when the finger 320 is located on the bottom edge of the sensing region 210. In contrast, as shown in FIG. 11B, an object is detected in the top half 1101 of the frame 1120 while no object is detected in the bottom half 1102 of the frame 1120. With reference for example to FIG. 3, the frame 1120 may be captured when the finger 320 is located on the top edge of the sensing region 210.

FIGS. 12A and 12B show a sequence of frames of sensor data 1210 and 1220, respectively, corresponding to an example gesture input according to some embodiments. More specifically, the frame 1220 of FIG. 12B may be captured sometime after the frame 1210 of FIG. 12A. In the example of FIGS. 12A and 12B, the gesture input may correspond to a downward swiping motion. As shown in FIG. 12A, an object (depicted as a gray circle) is detected in a top half 1201 of the frame 1210 while no object is detected in a bottom half 1202 of the frame 1210. With reference for example to FIG. 3, the frame 1210 may be captured when the finger 320 is located on the top edge of the sensing region 210. In contrast, as shown in FIG. 12B, an object is detected in the bottom half 1202 of the frame 1220 while no object is detected in the top half 1201 of the frame 1220. With reference for example to FIG. 3, the frame 1220 may be captured when the finger 320 is located on the bottom edge of the sensing region 210.

Figures 13A, 13B, 13C:
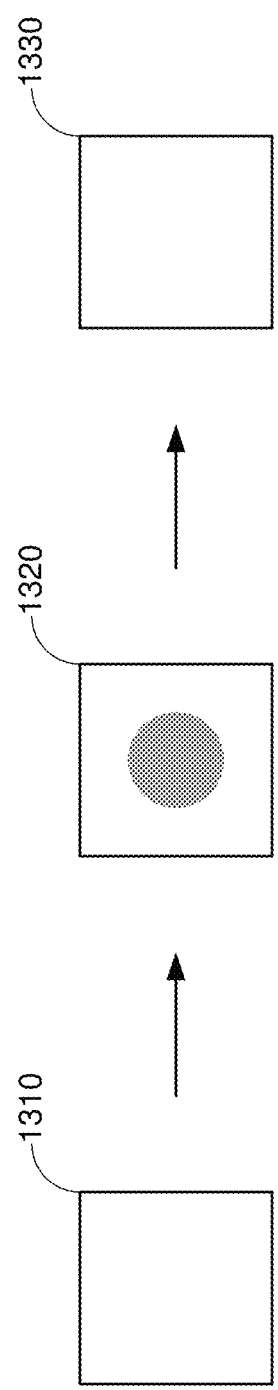
FIGS. 13A-13C show a sequence of frames of sensor data corresponding to an example gesture input according to some embodiments.

FIGS. 13A-13C show a sequence of frames of sensor data 1310-1330, respectively, corresponding to an example gesture input according to some embodiments. More specifically, the frame 1320 of FIG. 13B may be captured sometime after the frame 1310 of FIG. 13A, and the frame 1330 of FIG. 13C may be captured sometime after the frame 1320 of FIG. 13B. In the example of FIGS. 13A-13C, the gesture input may correspond to a tapping motion. As shown in FIG. 13A, no object is detected in the frame 1310. Then, as shown in FIG. 13B, an object is detected in the frame 1320. Finally, as shown in FIG. 9C, no object is detected in the frame 1330. In some implementations, the object may be detected in substantially the same position across a number of consecutive frames (between frames 1310 and 1330). The duration of the tapping gesture may be correlated with the number of consecutive frames in which the object is detected.

Figure 14:
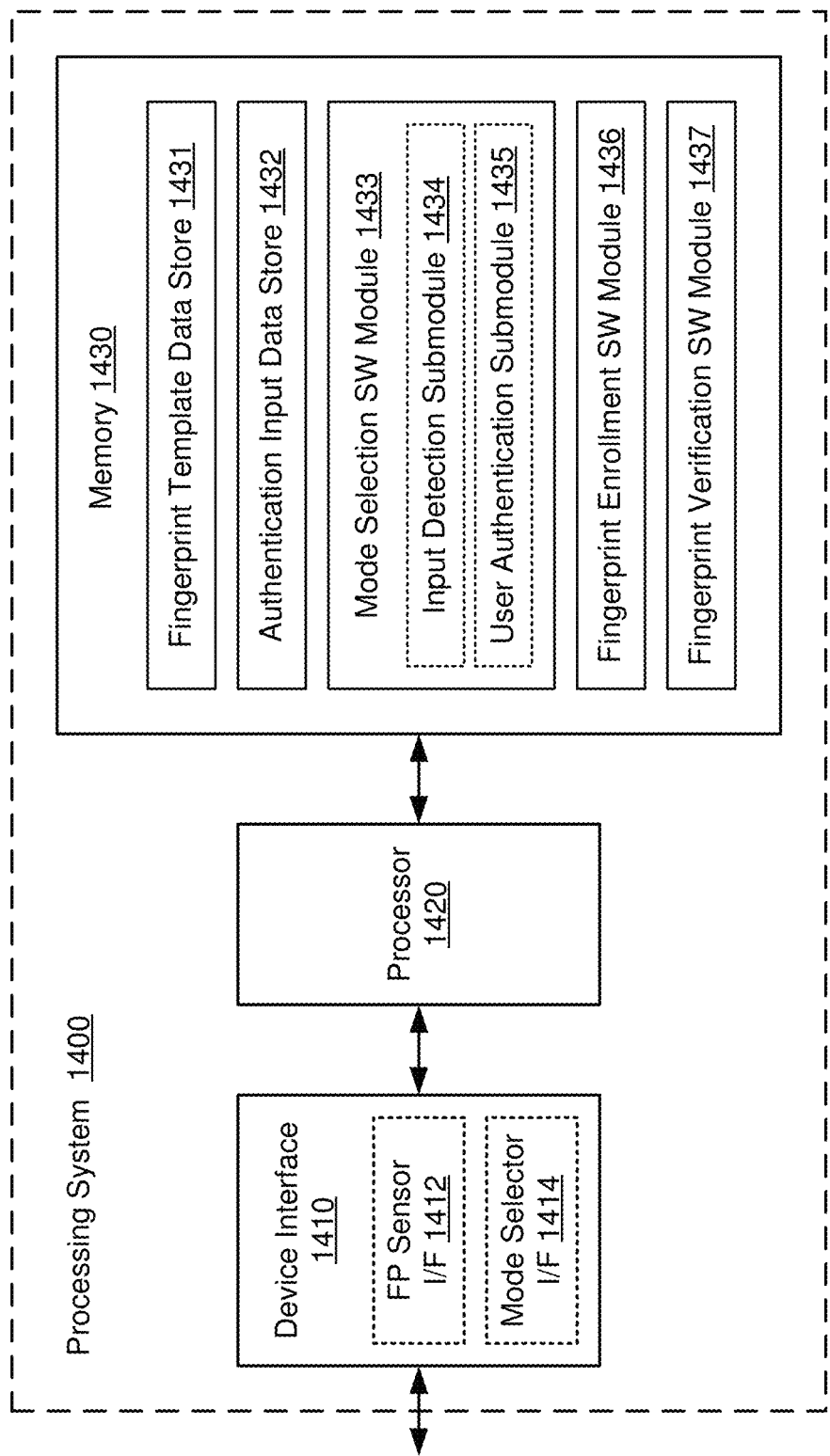
FIG. 14 shows a block diagram of a processing system for a fingerprint sensing apparatus according to some embodiments.

FIG. 14 shows a block diagram of a processing system 1400 for a fingerprint sensing apparatus according to some embodiments. The processing system 1400 may be an example embodiment of the processing system 110 of FIG. 1 and/or the fingerprint scanning module 220 of FIG. 2. Thus, the processing system 1400 may include a device interface 1410, a processor 1420, and a memory 1430. For purposes of discussion herein, processor 1420 is shown in FIG. 14 as being coupled between the device interface 1410 and memory 1430. In actual implementations, the device interface 1410, processor 1420, and/or memory 1430 may be connected together using one or more buses (not shown for simplicity).

The device interface 1410 may include a fingerprint (FP) sensor interface (I/F) 1412 and mode selector interface 1414. The FP sensor interface 1412 may be used to communicate with one or more fingerprint sensors of the fingerprint sensing apparatus (such as the fingerprint sensors 212 of FIG. 2). For example, the FP sensor interface 1412 may transmit activation signals to, and receive fingerprint sensor data from, an array of fingerprint sensors to capture frames of sensor data (e.g., optical or capacitive images) of a sensing region of the fingerprint sensing apparatus. The mode selector interface 1414 may be used to communicate with one or more electrical or mechanical actuators of the fingerprint sensing apparatus (such as the mode selector 230 of FIG. 2). For example, the mode selector interface 1414 may receive mode select signals from the electrical or mechanical actuators indicating a change of operating mode of the fingerprint sensing apparatus.

The memory 1430 includes a fingerprint template data store 1431 and an authentication input data store 1432. The fingerprint template data store 1431 may be configured to store fingerprint templates (or other fingerprint information) for one or more authorized users of the fingerprint sensing apparatus. The fingerprint templates may be used to verify fingerprints detected in the sensing region when the fingerprint sensing apparatus operates in a fingerprint verification mode. The authentication input data store 1432 may be configured to store a preconfigured sequence of authentication inputs for one or more authorized users of the fingerprint sensing apparatus. The preconfigured sequence of authentication inputs may be used to authenticate a user of the fingerprint sensing apparatus when switching to a fingerprint enrollment mode. In some embodiments, the authentication inputs may correspond to gesture inputs such as described with respect to FIGS. 3-13C.

Memory 1430 may further include a non-transitory computer-readable medium (e.g., one or more nonvolatile memory elements, such as EPROM, EEPROM, Flash memory, a hard drive, and so on) that may store at least the following software (SW) modules:
- a mode selection SW module 1433 to selectively switch an operation of the fingerprint sensing apparatus between a fingerprint verification mode and a fingerprint enrollment mode based, at least in part, on mode select signals received via the mode selector interface 1414, the mode selection SW module 1433 including:
    - an input detection submodule 1434 to convert fingerprint sensor data received via the FP sensor interface 1412 to a sequence of authentication (e.g., gesture) inputs; and
    - a user authentication submodule 1435 to selectively authenticate a user of the fingerprint sensing apparatus by comparing the received sequence of authentication inputs to the preconfigured sequence stored in the authentication input data store 1432;
- a fingerprint enrollment SW module 1436 to enroll, manage, or delete one or more fingerprint templates in the fingerprint template data store 1431; and
- a fingerprint verification SW module 1437 to verify a user's fingerprint by comparing fingerprint sensor data received via the FP sensor interface 1412 with one or more fingerprint templates stored in the fingerprint template data store 1431.

Each software module includes instructions that, when executed by processor 1420, cause the processing system 1400 to perform the corresponding functions. The non-transitory computer-readable medium of memory 1430 thus includes instructions for performing all or a portion of the operations described below with respect to FIG. 9.

The processor 1420 may be any suitable one or more processors capable of executing scripts or instructions of one or more software programs stored in the processing system 1400 (e.g., within memory 1430). For example, the processor 1420 may execute the mode selection SW module 1433 to selectively switch an operation of the fingerprint sensing apparatus between a fingerprint verification mode and a fingerprint enrollment mode based, at least in part, on mode select signals received via the mode selector interface 1414. In executing the mode selection SW module 1433, the processor 1420 may also execute the input detection submodule 1434 and the user authentication submodule 1435. For example, the processor 1420 may execute the input detection submodule 1434 to convert fingerprint sensor data received via the FP sensor interface 1412 to a sequence of authentication (e.g., gesture) inputs. Further, the processor 1420 may execute the user authentication submodule 1435 to selectively authenticate a user of the fingerprint sensing apparatus by comparing the received sequence of authentication inputs to the preconfigured sequence stored in the authentication input data store 1432.

The processor 1420 may also execute the fingerprint enrollment SW module 1436 to enroll, manage, or delete one or more fingerprint templates in the fingerprint template data store 1431. Still further, processor 1420 may execute the fingerprint verification SW module 1437 to verify a user's fingerprint by comparing fingerprint sensor data received via the FP sensor interface 1412 with one or more fingerprint templates stored in the fingerprint template data store 1431.

Figure 15:
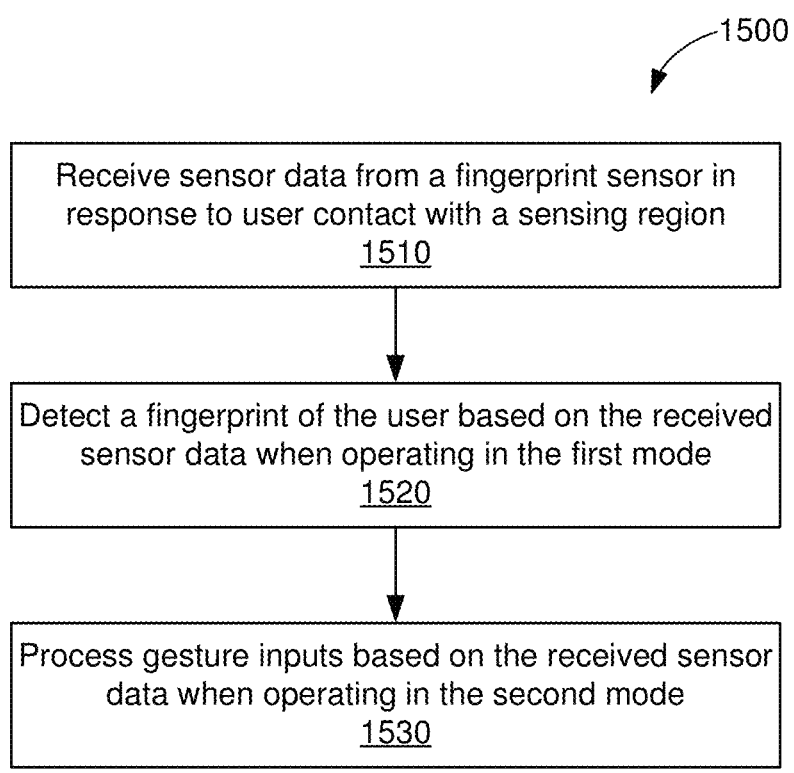
FIG. 15 shows an illustrative flowchart depicting an example operation for processing fingerprint sensor data according to some embodiments.

FIG. 15 shows an illustrative flowchart depicting an example operation 1500 for processing fingerprint sensor data according to some embodiments. With reference for example to FIG. 2, the operation 1500 may be performed by the fingerprint sensing apparatus 200 to perform in-sensor fingerprint enrollment and verification (e.g., without relying on a host processor or CPU). In some embodiments, the fingerprint sensing apparatus may be operable in at least a first mode and a second mode. For example, the first mode may correspond to a fingerprint verification mode and the second mode may correspond to a fingerprint enrollment mode.

The fingerprint sensing apparatus receives sensor data from a fingerprint sensor in response to user contact with a sensing region (1510). In some embodiments, the fingerprint sensor may use capacitive and/or optical fingerprint imaging technologies to scan or image a user's finger in the sensing region. In some embodiments, the sensor data may include one or more frames of optical sensor data from the sensing region. In some other embodiments, the sensor data may include one or more frames of capacitive sensor data from the sensing region.

The fingerprint sensing apparatus may detect a fingerprint of the user based on the received sensor data when operating in the first mode (1520). In some embodiments, while operating in the fingerprint verification mode, the fingerprint sensing apparatus may compare the received sensor data with one or more fingerprint templates to determine a measure of similarity between the current user's fingerprint and an authorized user's fingerprint. If a verified fingerprint cannot be detected from the receiving sensor data (e.g., the similarity measure is below a threshold level), the fingerprint sensing apparatus may prevent the user from accessing or operating at least some aspects of the corresponding electronic system. On the other hand, if the user's fingerprint is verified (e.g., the similarity measure is above the threshold level), the fingerprint sensing apparatus may allow the user to access or operate the corresponding electronic system.

The fingerprint sensing apparatus may process gesture inputs based on the received sensor data when operating in the second mode (1530). In some embodiments, when switching to the fingerprint enrollment mode, the fingerprint sensing apparatus may repurpose the received sensor data to perform a low-level user authentication. With reference for example to FIGS. 3-13C, the fingerprint sensing apparatus may detect the gesture inputs from a sequence of frames of sensor data captured of the sensing region. The gesture inputs may correspond to directional swiping gestures (e.g., left, right, up, or down) and/or tap-related gestures (e.g., tap, long press, press-and-hold, and the like). The fingerprint sensing apparatus may authenticate the user by comparing the gesture inputs to a preconfigured pattern or combination of gestures input by the user during an initial setup of the fingerprint sensing apparatus. If the received gesture inputs match the preconfigured combination of gestures, the fingerprint sensing apparatus may enable the user to enroll, manage, or delete one or more fingerprints. However, if the received gesture inputs do not match the preconfigured combination of gestures, the fingerprint sensing apparatus may switch back to the fingerprint verification mode.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, embodiments have been described with reference to specific examples thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A sensing apparatus, comprising:
a fingerprint sensor configured to generate sensor data in response to user contact with a sensing region; and a processing system operable in at least a first mode and a second mode, the processing system being configured to:
- detect a fingerprint of the user based on the sensor data when operating in the first mode;
- process gesture inputs based on the sensor data when operating in the second mode, wherein the sensor data used to process the gesture inputs has a lower resolution than the sensor data used to detect the fingerprint of the user; and
- selectively authenticate the user based on the gesture inputs when operating in the second mode.

2. The sensing apparatus of claim 1, wherein the fingerprint sensor includes a plurality of sensing elements, the processing system being further configured to:
- activate only a subset of the plurality of sensing elements when operating in the second mode.

3. The sensing apparatus of claim 2, wherein the plurality of sensing elements includes one or more optical, capacitive, or ultrasonic sensing elements.

4. The sensing apparatus of claim 1, wherein the processing system is to detect each of the gesture inputs by:
- monitoring a movement of an input object in the sensing region based on changes across two or more frames of the sensor data; and
- detecting the gesture input based on a direction, magnitude, duration, or orientation of the movement.

5. The sensing apparatus of claim 1, further comprising:
- an actuator configured to toggle the processing system between the first mode and the second mode in response to user input.

6. The sensing apparatus of claim 5, wherein the actuator comprises a button or switch, and wherein the fingerprint sensor is disposed on the actuator.

7. The sensing apparatus of claim 1, wherein the processing system is further configured to:
- selectively switch between the first mode and the second mode based at least in part on the gesture inputs.

8. The sensing apparatus of claim 1, wherein, while operating in the second mode, the processing system is further configured to:
- enable the user to enroll or manage fingerprints on the sensing apparatus responsive to authenticating the user.

9. The sensing apparatus of claim 1, wherein the processing system is to selectively authenticate the user by:
- comparing the gesture inputs with a predetermined sequence of gestures; and
- authenticating the user responsive to determining that the gesture inputs match the predetermined sequence of gestures.

10. The sensing apparatus of claim 9, wherein the processing system is to further:
- disable the second mode of operation for at least a threshold duration responsive to determining that the gesture inputs do not match the predetermined sequence of gestures.

11. A method performed by a sensing apparatus operable in at least a first mode and a second mode, the method comprising:
- receiving sensor data from a fingerprint sensor in response to user contact with a sensing region;
- detecting a fingerprint of the user based on the sensor data when operating in the first mode;
- processing gesture inputs based on the sensor data when operating in the second mode, wherein the sensor data used to process the gesture inputs has a lower resolution than the sensor data used to detect the fingerprint of the user; and
- selectively authenticating the user based on the gesture inputs when operating in the second mode.

12. The method of claim 11, wherein the fingerprint sensor includes a plurality of sensing elements, the method further comprising:
- activating only a subset of the plurality of sensing elements when operating in the second mode.

13. The method of claim 12, wherein the plurality of sensing elements includes one or more optical, capacitive, or ultrasonic sensing elements.

14. The method of claim 12, wherein the detecting comprises:
- monitoring a movement of an input object in the sensing region based on changes across two or more frames of the sensor data; and
- detecting the gesture input based on a direction, magnitude, duration, or orientation of the movement.

15. The method of claim 11, further comprising:
- receiving user input via an actuator; and
- selectively toggling between the first mode and the second mode in response to the user input.

16. The method of claim 11, further comprising:
- selectively switching between the first mode and the second mode based at least in part on the gesture inputs.

17. The method of claim 11, further comprising, while operating in the second mode:
- enabling the user to enroll or manage fingerprints on the sensing apparatus responsive to authenticating the user.

18. The method of claim 11, wherein the selectively authenticating comprises:
- comparing the gesture inputs with a predetermined sequence of gestures; and
- authenticating the user responsive to determining that the gesture inputs match the predetermined sequence of gestures.

19. The method of claim 18, further comprising:
- disabling the second mode of operation for at least a threshold duration responsive to determining that the gesture inputs do not match the predetermined sequence of gestures.

20. A system operable in at least a first mode and a second mode, the system comprising:
- one or more processors; and
- a memory storing instructions that, when executed by the one or more processors, cause the system to:
  - receive sensor data from a fingerprint sensor in response to user contact with a sensing region;
  - detect a fingerprint of the user based on the sensor data when operating in the first mode;
  - process gesture inputs based on the sensor data when operating in the second mode, wherein the sensor data used to process the gesture inputs has a lower resolution than the sensor data used to detect the fingerprint of the user; and
  - selectively authenticate the user based on the gesture inputs when operating in the second mode.

* * * * *